(12) United States Patent
Tabuchi et al.

(10) Patent No.: US 10,165,170 B2
(45) Date of Patent: Dec. 25, 2018

(54) METHODS AND APPARATUS FOR AUTOFOCUS

(71) Applicant: SEMICONDUCTOR COMPONENTS INDUSTRIES, LLC, Phoenix, AZ (US)

(72) Inventors: Yoshihisa Tabuchi, Gifu (JP); Takeshi Kura, Ogaki (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 33 days.

(21) Appl. No.: 15/450,640

(22) Filed: Mar. 6, 2017

(65) Prior Publication Data

US 2018/0255221 A1 Sep. 6, 2018

(51) Int. Cl.
*H04N 5/232* (2006.01)
(52) U.S. Cl.
CPC .................... *H04N 5/232* (2013.01)
(58) Field of Classification Search
CPC ...................................................... H04N 5/232
USPC .......................................................... 348/349
See application file for complete search history.

(56) References Cited

U.S. PATENT DOCUMENTS

| 2012/0256578 | A1 | 10/2012 | Lyden |
| 2013/0038781 | A1* | 2/2013 | Inaji ..................... H02P 23/005 348/357 |
| 2014/0184881 | A1 | 7/2014 | McKinley |
| 2014/0355119 | A1 | 12/2014 | Matsumoto |

FOREIGN PATENT DOCUMENTS

| JP | 2010271359 A | 12/2010 |
| JP | 2016045695 A | 4/2016 |

* cited by examiner

*Primary Examiner* — Joel W Fosselman
(74) *Attorney, Agent, or Firm* — The Noblitt Group, PLLC; Hettie L. Haines (57) ABSTRACT

Various embodiments of the present technology may comprise a method and apparatus for autofocus. In various embodiments, the methods and apparatus may decrease a settling time of a lens by increasing the target position gradually, varying the gain of a PID controller, and adding a kick pulse to a position signal.

20 Claims, 11 Drawing Sheets

METHODS AND APPARATUS FOR AUTOFOCUS

BACKGROUND OF THE TECHNOLOGY

Electronic devices, such as cellular telephones, cameras, and computers, commonly use a lens module in conjunction with an image sensor to capture images. Many imaging systems employ autofocus methods and technology to improve image quality by adjusting the position of the lens relative to the image sensor.

Autofocus systems analyze image data from the image sensor to determine the optimal position of the lens. In general, due to the mechanical mechanisms used in the autofocus system, the lens oscillates for some period of time before it reaches a target position. This time delay is often referred to as the settling time. Decreasing the settling time provides a user with the ability to capture images at an increased frame rate.

SUMMARY OF THE INVENTION

Various embodiments of the present technology may comprise methods and apparatus for autofocus. In various embodiments, the methods and apparatus may decrease a settling time of a lens by increasing the target position gradually, varying the gain of a PID controller, and adding a kick pulse to a position signal.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various actuators, sensors, lenses, semiconductor devices, such as transistors and capacitors, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
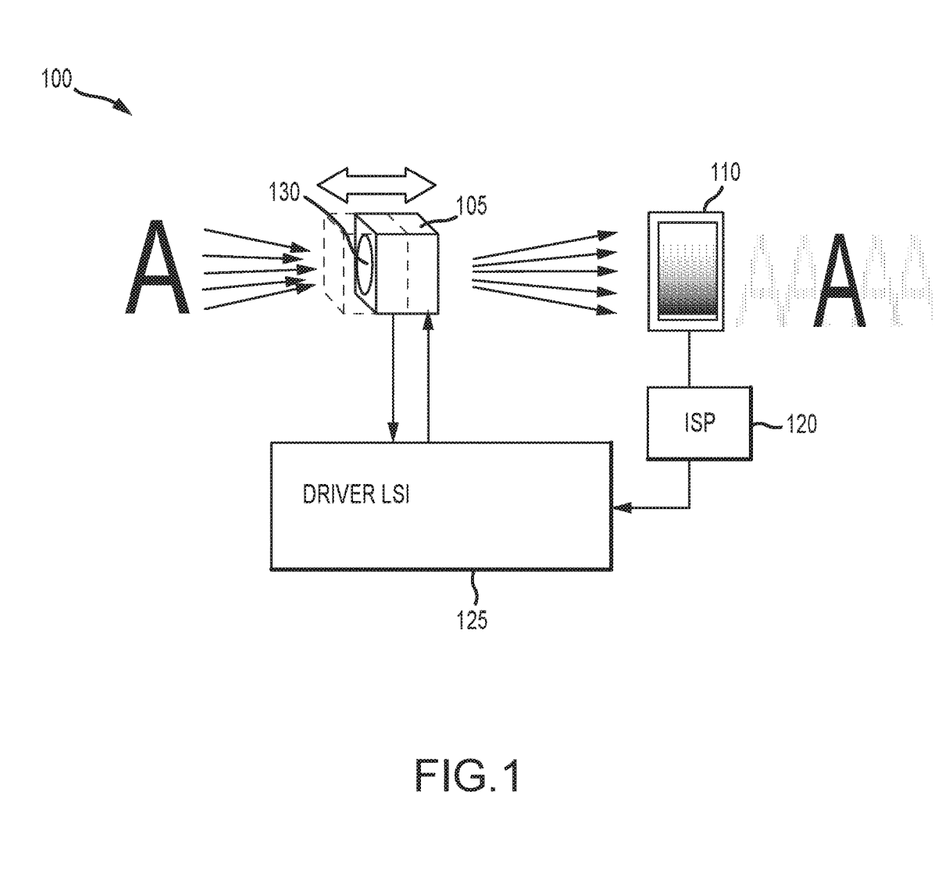
FIG. 1 representatively illustrates an imaging system in accordance with an exemplary embodiment of the present technology.
Figure 2:
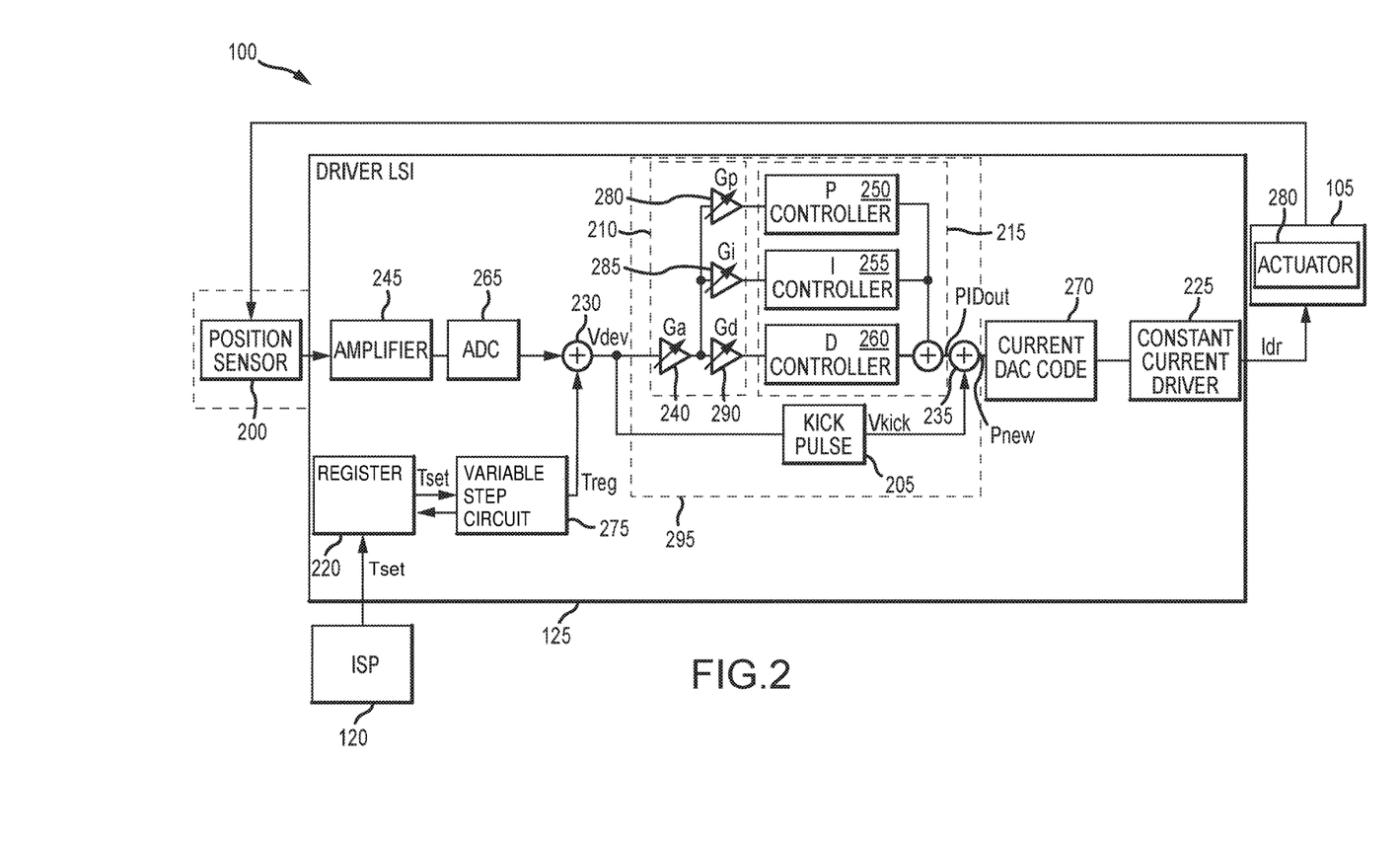
FIG. 2 is a block diagram of an autofocus system in accordance with an exemplary embodiment of the present technology.

Methods and apparatus for autofocus according to various aspects of the present technology may operate in conjunction with any suitable electronic system, such as imaging systems, "smart devices," wearables, consumer electronics, and the like. Referring to FIGS. 1 and 2, an exemplary imaging system 100 may be incorporated into an electronic device, such as a digital camera or portable computing device. For example, in various embodiments, the imaging system 100 may comprise an image sensor 110, an image signal processor 120, a lens module 105, and a driver circuit 125 that operate together to automatically focus an object or a scene on the image sensor 110.

The image sensor 110 may be suitably configured to capture image data. For example, the image sensor 110 may comprise a pixel array (not shown) to detect the light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 110 may be implemented in conjunction with any appropriate technology, such as active pixel sensors in complementary metal-oxide-semiconductors (CMOS) and charge-coupled devices.

The lens module 105 may be configured to focus light on a sensing surface of the image sensor 110. For example, the lens module 105 may comprise a lens 130, with a fixed diameter, positioned adjacent to the sensing surface of the image sensor 110. The lens module 105 may further comprise an actuator 280, such as a voice coil motor (VCM), configured to reposition the lens 130.

In various embodiments, the imaging system 100 is configured to move portions of the lens module 105 that are secured or otherwise coupled to the lens 130. For example, the lens module 105 may comprise a telescoping portion that moves relative to a stationary portion. In various embodiments, the lens 130 may be secured or coupled to the telescoping portion and the actuator 280 may move the telescoping portion to shift the lens 130 away from or closer to the image sensor 110 that is secured to the stationary portion to focus the object or scene on the image sensor 110.

In various embodiments, the image signal processor 120 may perform various digital signal processing functions, such as color interpolation, color correction, facilitate autofocus, exposure adjustment, noise reduction, white balance adjustment, compression, and the like, to produce a final output image. The image signal processor 120 may comprise any number of semiconductor devices, such as transistors, capacitors, and the like, for performing calculations, transmitting and receiving image pixel data, and a storage unit, such as random-access memory, non-volatile memory or any other memory device suitable for the particular application, for storing pixel data. In various embodiments, the image signal processor 120 may be implemented with a programmable logic device, such as a field programmable gate array (FPGA) or any other device with reconfigurable digital circuits. In other embodiments, the image signal processor 120 may be implemented in hardware using non-programmable devices. The image signal processor 120 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

The image signal processor 120 may be configured to transmit the output image to an output device (not shown), such as a display screen or a memory component, for storing and/or viewing the image data. The output device may receive digital image data, such as video data, image data, frame data, and/or gain information from the image signal processor 120. In various embodiments, the output device may comprise an external device, such as a computer display, memory card, or some other external unit.

The system 100 may further comprise a position sensor 200, such as a hall sensor, to detect movement and a position of the lens 130. The position sensor 200 may be integrated in the lens module 105 or the driver circuit 125. The position sensor 200 may determine the position of the lens 130 by varying an output voltage in response to a magnetic field. The output voltage may correspond to a magnitude and direction the lens 130 relative to a reference point.

The driver circuit 125 controls and supplies power to various devices within the system. For example, the driver circuit 125 may control and supply power to the lens module 105 to move the actuator 280. The driver circuit 125 may operate in conjunction with the image signal processor 120 and the position sensor 200 to determine the appropriate amount of power to supply to the actuator 280. The driver circuit 125 may supply a constant driver current $I_{dr}$, having a magnitude and direction, to the actuator 280. In other embodiments, the driver circuit 125 may be configured to provide a constant voltage or pulse width modulation with a fixed duty cycle. In general, the actuator 280 responds to the constant driver current by moving the lens 130 an amount that is in proportion to the amount of power supplied by the driver circuit 125. The driver circuit 125 may receive and respond to various signals to determine an appropriate position of the lens 130. For example, the driver circuit 125 may receive information related to the current position of the lens 130 via the position sensor 200 and information, via a target position signal, from the image signal processor 120 related to the target position of the lens 130. The driver circuit 125 may comprise any suitable device or system capable of providing energy to the actuator 280.

The driver circuit 125 may further comprise various circuits and/or systems to decrease the length of time it takes the lens 130 to reach the target position. In general, once the driver circuit 125 receives the target position signal from the image signal processor 120, the lens 130 oscillates for a period of time before it settles into the desired target position or within a predetermined threshold range. This period of time may be referred to as the settling time. In various embodiments, the driver circuit 125 may comprise any suitable device and/or system to perform gain control, calculate a variable step function, and boost a signal with a kick pulse, which may, in combination or individually, decrease the settling time. For example, the driver circuit 125 may comprise a variable step circuit 275, register 220, an amplifier, a first summing circuit 230, a signal control circuit 295, and a constant current driver 225. The driver circuit 125 may further comprise at least one signal converter to convert a signal from an analog signal to a digital signal and/or from a digital signal to an analog signal. For example, the driver circuit 125 may comprise a digital-to-analog converter (DAC) 270 and/or an analog-to-digital converter (ADC) 265.

The amplifier 245 may be configured to amplify a signal, such as a signal from the position sensor 200. The amplifier 245 may be coupled to both the position sensor 200 and the ADC 265. For example, the amplifier 245 may be coupled in series with the position sensor 200 and the ADC 265. The amplifier 245 may be coupled to an output of the position sensor 200 to receive the position signal, amplify the position signal, and output an amplified position signal to ADC 265.

In an exemplary embodiment, the ADC 265 may be configured to receive an analog signal and convert the signal to a digital signal. For example, the ADC 265 may be coupled in series with the position sensor 200 and the amplifier 245, and may receive the amplified position signal from the amplifier 245. The ADC 265 may transmit an ADC output signal to the first summing circuit 230.

The variable step circuit 275 may retrieve a target value setting Tset (e.g., a target position) of the lens 130 that corresponds to the position needed to produce an in-focus image on the image sensor 110. The variable step circuit 275 may further compute an intermediate target position Treg. The variable step circuit 275 may be coupled to the ISP 120 to receive data relating to the target value setting Tset and adjust the target value setting Tset to arrive at the intermediate target position Treg. The variable step circuit 275 may comprise any suitable circuit and/or systems to store data and compute a value according to a desired output.

Figure 9:
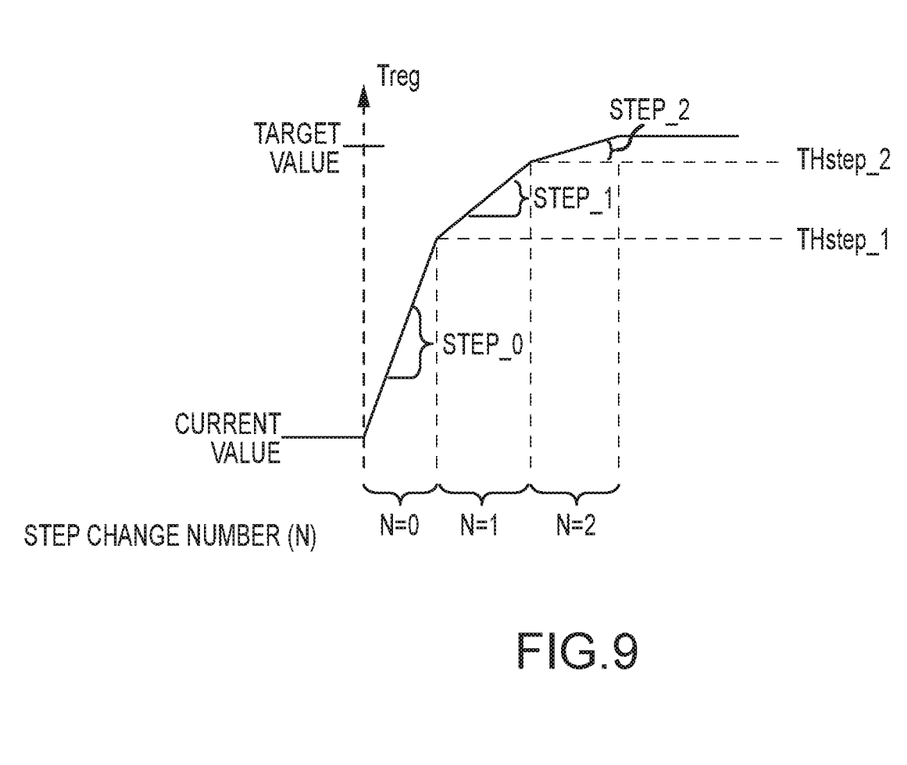
FIG. 9 representatively illustrates calculating an intermediate target position in accordance with an exemplary embodiment of the present technology.

In an exemplary embodiment, and referring to FIG. 9, the variable step circuit 275 may compute the intermediate target position Treg according to a step change number N (where N=0, 1, 2, . . . N+1), a step width number Step_N (where N=0, 1, 2, . . . N+1), and a step change threshold THstep_N (where N=1, 2, . . . N+1). The variable step circuit 275 may be configured to retrieve data stored in the register 220, such as the target value setting Tset. In an exemplary embodiment, the variable step circuit 275 computes the intermediate target position Treg to be less than the target value setting Tset to ensure that the position of the lens 130 changes gradually. The variable step circuit 275 may comprise any device and/or system capable of calculating the intermediate target position Treg that is less than the target value setting Tset.

The register 220 may be configured to store the target value setting Tset. For example, the register may be coupled to the ISP 120 and may receive continually-updated position data from the ISP 120. The register 220 may be configured to continually store new position data as the target value setting Tset is transmitted from the ISP 120. The register may 220 be configured to store both new data and data from a previous cycle. For example, the register 220 may store a current target value setting Tset and a previous target value setting Tset_pre, wherein the previous target value setting Tset_pre is the target value setting from a previous cycle. The register 220 may also be configured to store the intermediate target position Treg. For example, the register 220 may store both a new intermediate target position Treg_new and a previous intermediate target position Treg_pre, wherein the previous intermediate target position Treg_pre is the target position from a previous cycle. The register 220 may comprise any suitable memory or storage device capable of updating and storing the target value setting Tset.

The first summing circuit 230 may be configured to sum (i.e., add) one or more input values. For example, the first summing circuit 230 may receive as inputs the intermediate target position Treg and the ADC output signal as inputs. The summing circuit 230 may sum the values and output a deviation value Vdev. The first summing circuit 230 may comprise any device and/or system suitable for summing.

The signal control circuit 295 may be configured to perform various signal processing functions, for example the signal control circuit 295 may, adjust a gain of an error signal, compute a control variable, and adjust the magnitude and direction of the control variable. For example, the signal control circuit 295 may be coupled to the first summing circuit 230 and receive the deviation value Vdev as the input error signal, adjust the gain of the deviation value Vdev, compute the control variable PIDout according to the deviation value Vdev, output the control variable PIDout, and adjust the magnitude and direction of the control variable PIDout. The signal control circuit 295 may comprise any number of circuits suitable for performing gain control of an input, computing a control variable, and adjusting the magnitude and direction of the control variable. In an exemplary embodiment, the signal control circuit 295 comprises a kick pulse circuit 205, a gain control circuit 210, a PID controller 215, and a second summing circuit 235.

The kick pulse circuit 205 may be configured to generate a kick pulse signal Vkick. The kick pulse circuit 205 may compute the kick pulse signal Vkick according to the deviation value Vdev. In various embodiments, the kick pulse signal Vkick is introduced only if the deviation value Vdev is outside of a predetermined threshold range. For example, and referring to FIG. 8C, the threshold range may comprise a maximum threshold value THmax that is greater than the target value setting Tset and a minimum threshold value THmin that is less than the target value setting Tset. As such, if the deviation value Vdev is less than the maximum threshold value TH max and greater than the minimum threshold value THmin, then the kick pulse circuit 205 will not generate the kick pulse signal Vkick. If the deviation value is greater than the maximum threshold value THmax, then the kick pulse circuit 205 will generate the kick pulse signal Vkick. Similarly, if the deviation value Vdev is less than the minimum threshold value THmin, then the kick pulse circuit 205 will generate the kick pulse signal Vkick. The minimum and maximum threshold values THmin, THmax may be fixed according to any suitable parameters such as the desired operating specifications, settling time, power consumption, and the like.

The gain control circuit 210 may be configured to control the gain of an error signal, for example the deviation value Vdev. The gain control circuit 210 may comprise any suitable device and/or system to increase or decrease the gain of the deviation value Vdev. For example, the gain control circuit 210 may comprise a first gain element 240, a second gain element 280, a third gain element 285, and a fourth gain element 290. The gain elements 240, 280, 285, 290 may comprise an amplifier having a variable gain. For example, the first gain element 240 may have a variable gain Ga, the second gain element 280 may have a variable gain Gp, the third gain element 285 may have a variable gain Gi, and the fourth gain element 290 may have a variable gain Gd. The gain of each gain element 240, 280, 285, 290 may be set according to the desired operating characteristics, power consumption, operating characteristics of the PID controller 215, and the like.

The first gain element 240 may be coupled in series with the second, third, and fourth gain elements 280, 285, 290, while the second, third, and fourth gain elements 280, 285, 290 may be coupled in parallel. For example, the first gain element 240 may amplify the deviation value Vdev first, and then the second, third, and fourth gain elements 280, 285, 290 amplify the deviation value Vdev again. The second, third, and fourth gain elements 280, 285, 290 may output each of the amplified deviation values Vdev to the PID controller 215.

The PID controller 215 may be configured to receive the error value, such as the deviation value Vdev, and apply a correction based on proportional, integral and derivative terms. The PID controller 215 may operate to minimize the error over time by adjusting a control variable PIDout. The PID controller 215 may comprise a conventional PID controller circuit. For example, the PID controller 215 may comprise a P controller 250 to account for present values of the error, an I controller 255 to account for past values of the error, and a D controller 260 to account for possible future trends of the error, based on a current rate of change. The PID controller may transmit the control variable PIDout to the second summing circuit 235. In various embodiments, the system 100 may further comprise a filter (not shown) coupled to the PID controller 215 to remove noise from various PID process signals.

The second summing circuit 235 may be configured introduce the kick pulse signal Vkick to the control variable PIDout. For example, the second summing circuit 235 may sum (i.e., add) the kick pulse signal Vkick and the control variable PIDout. In various embodiments, the second summing circuit 235 may be coupled to and receive the control variable from the PID controller 215. The second summing circuit 235 may be further coupled to and receive the kick pulse signal Vkick from the kick pulse circuit 205. The summing circuit 230 may sum the values and output a new position value Pnew and transmit the new position value Pnew to the DAC 270. The first summing circuit 230 may comprise any device and/or system suitable for summing two or more values.

In various embodiments, the system 100 may further comprise a brake pulse circuit (not shown) to compute a brake pulse and a speed control circuit (not shown) to compute a speed control value. The brake pulse and the speed control value may also be utilized to compute the new position value Pnew.

The DAC 270 may be configured to receive and convert the new position value Pnew to an analog signal. The DAC 270 may comprise any circuit suitable for converting a digital signal to an analog signal. The DAC 270 may transmit the analog signal to the constant current driver 225.

The constant current driver 225 may receive and respond to the analog signal from the DAC 270 and provide a constant driver output signal, for example the driver current $I_{dr}$ (or voltage or PMW), to the actuator 280 to move the lens 130 to achieve the target position. The constant current driver 225 may comprise any suitable circuit for varying a voltage across the circuit in order to maintain a constant electrical current output. For example, the constant current driver 225 may transmit the driver current $I_{dr}$ to the lens module 105 to control the magnitude and direction of the actuator 280.

Figure 8A:
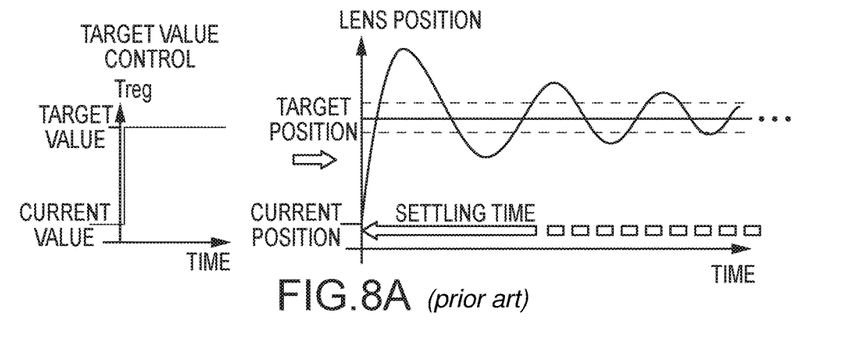
FIGS. 8A-8B representatively illustrates input target values and corresponding signals and signal settling times using conventional methods.
Figure 8B:
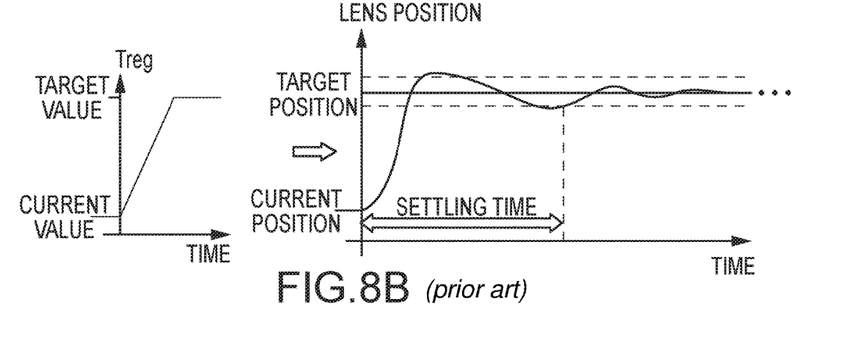
Figure 8C:
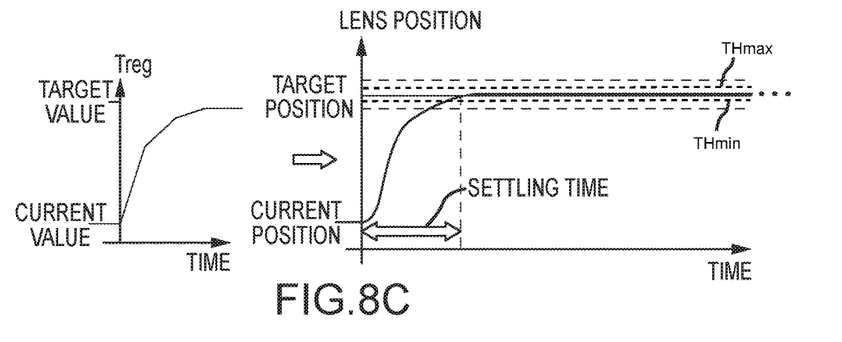
FIG. 8C representatively illustrates input target values and corresponding signals and signal settling times in accordance with an exemplary embodiment of the present technology.

In operation, the methods and apparatus for autofocus provides a settling time for the lens of an imaging system that is less than imaging systems with conventional operations. For example, and referring to FIGS. 8A-B, conventional operations may apply a direct move control (FIG. 8A) or a step move control (FIG. 8B), both of which result in the lens oscillating around the target position with higher amplitudes as compared to a system that implements a variable step move that applies the intermediate target value Treg (FIG. 8C). The methods and apparatus for autofocus may implement various operations suited to increase the gain of a signal, ensure that the lens position changes gradually, and provide a boost signal when appropriate to shorten the overall processing time to reach the target position.

Referring to FIGS. 1 through 10, in an exemplary operation, the system 100 processes the signal from the position sensor 200 and utilizes information from the image signal processor 120 to determine a new target position for the lens 130. The methods and operations facilitate reduction (or removal) of the lens oscillation around the target position, thereby decreasing the settling time. For example, and referring to FIG. 3, the operation may start (300) when the driver circuit 125 receives the position signal from the position sensor 200. In various embodiments, the position signal is then amplified by the amplifier 245. The amplifier 245 then transmits the amplified position signal to the ADC 265 where the ADC 265 converts the position signal into a digital signal (305).

The image signal processor 120 may transmit position data to the register 220 to update the target value setting Tset (310). The variable step circuit 275 may then determine if the target value setting Tset has been updated and whether or not to proceed to the next step. For example, and referring to FIG. 4, the variable step circuit 275 may start by obtaining the target value settings Tset stored in the register 220. For example, the variable step circuit 275 may retrieve the current target value setting Tset and the previous target value setting Tset_pre (400). The variable step circuit 275 may then determine whether or not the current target value setting Tset is different from the previous target value setting Tset_pre (405). If the current target value setting Tset is different than the previous target value setting Treg_pre, then a target value operation flag Ftarget is set to 1 (410), a gain counter is initialized and is set to zero (415), and a kick pulse counter is initialized and is set to zero (420). The variable step circuit 275 then determines if the target value setting Tset is greater than the previous intermediate target value Treg_pre (425). If the target value setting Tset is not greater than the previous intermediate target value Treg_pre, then a direction flag Fdir is set to −1 (435). If the target value setting Tset is greater than the previous intermediate target value Treg_pre, then the direction flag Fdir is set to +1 (430). The variable step circuit 275 then outputs the target value setting Tset with the corresponding direction flag Fdir.

The variable step circuit 275 may then calculate the new intermediate target value Treg_new (315). For example, and referring to FIG. 5, the variable step circuit 275 may operate by first receiving the target value operation flag Ftarget (500) from the register 220. If the target value operation flag Ftarget is not equal to one (505), then the operation ends and the variable step circuit 275 outputs the intermediate target value Treg from a previous cycle (i.e., Treg_pre).

Figure 5:
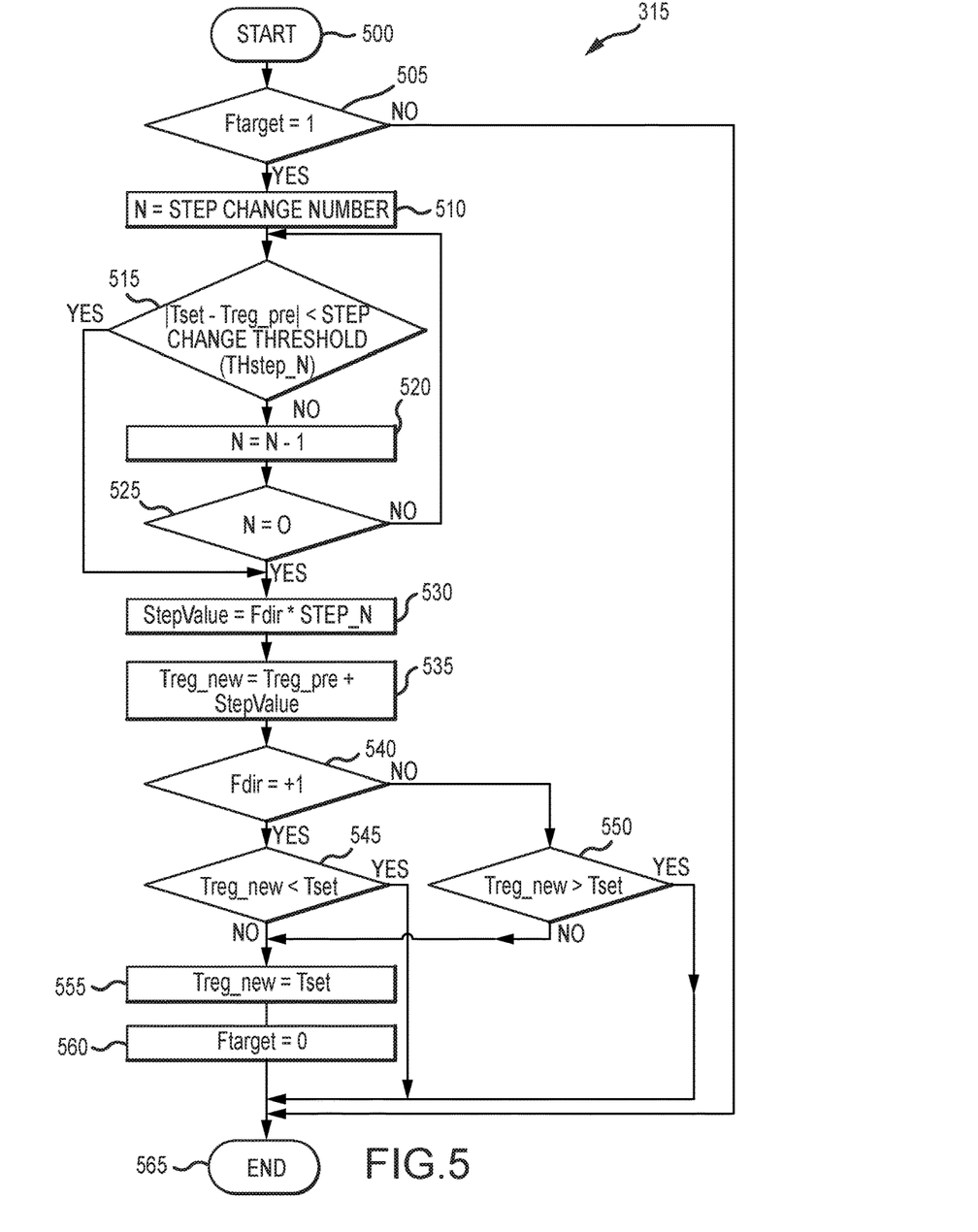
FIG. 5 is a flowchart for calculating a target value in an autofocus system in accordance with an exemplary embodiment of the present technology.

If the target value operation flag Ftarget is equal to one (505), then the variable step circuit 275 determines the step value (StepValue) utilizing the step width Step_N, the step change number N, the step change threshold THstep_N, the direction flag Fdir, the previous intermediate target value Treg_pre, and the target value setting Tset. The variable step circuit 275 may initialize the step change number N (510) and compare the difference of the target value setting Tset and the previous intermediate target value Treg_pre to the step change threshold THstep_N (515) according to the step change number N. Each step change number N may correspond to a particular step change threshold THstep_N. If the difference of the target value setting Tset and the previous intermediate target value Treg_pre is less than the step change threshold THstep_N, then the step value is computed (530). If the difference of the target value setting Tset and the intermediate target value Treg is not less than the step change threshold THstep_N, then the current step change number N is decremented by 1 (520). If the step change number N is equal to zero (525), then the step value is computed according to the equation StepValue=Fdir*Step_N (530). If the step change number N is not equal to zero (525), then the variable step circuit 275 reevaluates whether or not the difference of the target value setting Tset and the previous intermediate target value Treg_pre is less than the step change threshold THstep_N.

The variable step circuit 275 may compute the step value by multiplying the direction flag Fdir by the step change number N (530). Then the variable step circuit 275 computes the new intermediate target value Treg_new by adding the step value to the previous intermediate value Treg_pre (535).

The variable step circuit 275 then determines if the direction flag Fdir is equal to +1 (540). If the direction flag Fdir is equal to +1, then the variable step circuit 275 determines if the new intermediate target value Treg_new is less than the target value setting Tset (545). If the direction flag Fdir is not equal to +1, then the variable step circuit 275 determines if the new intermediate target value Treg_new is greater than the target value setting Tset (550).

If the new intermediate target value Treg_new is less than the target value setting Tset, then the operation ends and the variable step circuit 275 outputs the new intermediate target value Treg_new (565). If the new intermediate target value Treg_new is not less than the target value setting Tset, then the new intermediate target value Treg_new is set to be equal to the target value setting Tset (555) and the target value operation flag Ftarget is set to zero (560). The operation ends and the logic circuit 275 then outputs the new intermediate target Treg_new (565).

If the new intermediate target value Treg_new is greater than the target value setting Tset, then the operation ends and the variable step circuit 275 outputs the intermediate target value Treg (565). If the new intermediate target value Treg_new is not greater than the target value setting Tset, then the new intermediate target value Treg_new is set to be equal to the target value setting Tset (555) and the target value operation flag Ftarget is set to zero (560). The operation ends and the variable step circuit 275 then outputs the new intermediate target value Treg_new (565).

The variable step circuit 275 may then transmit the intermediate target value Treg to the first summing circuit 230. The first summing circuit 230 may then sum the most recent intermediate target value Treg (i.e., Treg_new) and the ADC output to obtain the deviation value Vdev.

The deviation value Vdev may then be transmitted to the gain control circuit 210, where the gain control circuit 210 performs a gain control operation (320). In various embodiments, the gain control circuit 210 computes and applies an overall gain with the first gain element 240 and further applies individual gains to the P controller 250, the I controller 255, and the D controller 260 via the second, third, and fourth gain elements 280, 285, 290, respectively (320). For example, and referring to FIG. 6, the gain control circuit 210 performs the gain operation that starts when the gain control circuit 210 receives the deviation value Vdev (600). The gain control circuit 210 then determines whether or not the gain counter is less than a gain-up time-up count value (i.e., the count value of the gain control circuit 210 execution time) (605). If the gain counter is less than the gain-up time-up count value, then the gain counter is incremented by 1 (610), the gain Gp of the P controller 250 is set to an up P gain value Gp_up (615), the gain Gi of the I controller 255 is set to an up I gain value Gi_up (620), and the gain Gd of the D controller 260 is set to an up D gain value Gd_up (625). Once the variable gains Gp, Gi, Gd have been set, the gain operation ends. The up gain values Gp_up, Gi_up, Gd_up may be fixed values and predetermined according to the specifications of the actuator 280.

Figure 6:
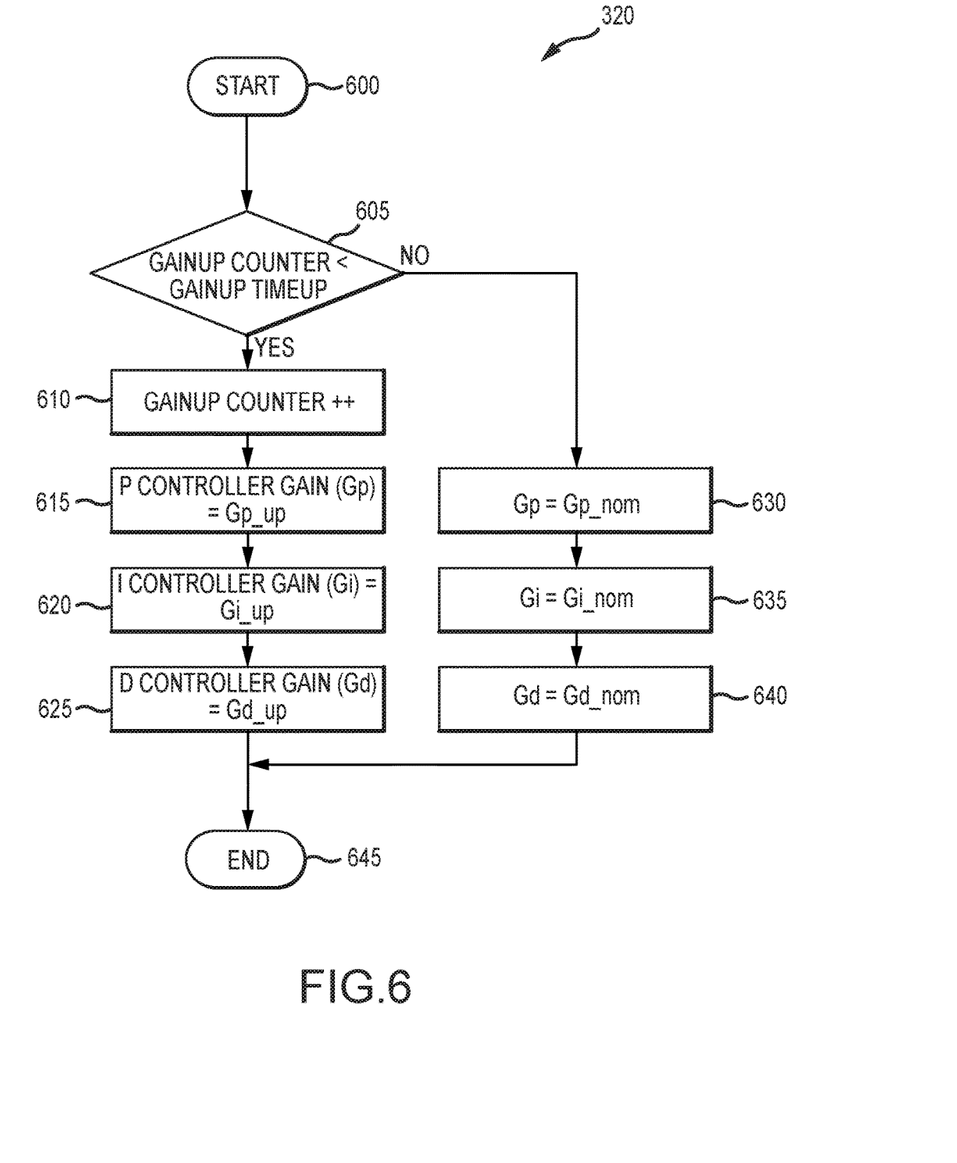
FIG. 6 is a flowchart for setting the gain in an autofocus system in accordance with an exemplary embodiment of the present technology.

If the gain counter is not less than the gain-up time-up count, then the gain Gp of the P controller 250 is set to a normal P gain value Gp_nom (630), the gain Gi of the I controller 255 is set to a normal I gain value Gi_nom (635), and the gain Gd of the D controller 260 is set to a normal D gain value Gd_nom (640). Once the variable gains Gp, Gi, Gd have been set, the gain operation ends. The normal gain values Gp_nom, Gi_nom, Gd_nom may be fixed values and predetermined according to the specifications of the actuator 280.

The deviation value Vdev may further be transmitted to the kick pulse circuit 205, where the kick pulse circuit 205 performs a kick pulse operation (325). In various embodiments, the kick pulse circuit 205 may determine if the kick pulse signal Vkick is necessary by comparing the deviation value Vdev to the maximum and minimum threshold THmax, THmin. If the deviation value Vdev is outside of the threshold range, then the kick pulse circuit 205 may activate the kick pulse operation (325). If the kick pulse circuit 205 activates the kick pulse operation (325), then the kick pulse operation (325) computes the magnitude and direction of the kick pulse signal Vkick (325). For example, and referring to FIG. 7, the kick pulse operation (325) may start by receiving the deviation value Vdev, the kickpulse counter value and a kickpulse timeup count value (i.e., the count value of the kick pulse circuit 205 execution time). The kick pulse circuit 205 may determine whether or not the kickpulse counter value is less than the kickpulse timeup count value. If the kickpulse counter value is not less than the kickpulse timeup count value, then the kickpulse value Vkick is set to zero (735) and the operation ends by outputting the kick pulse value Vkick (740).

Figure 7:
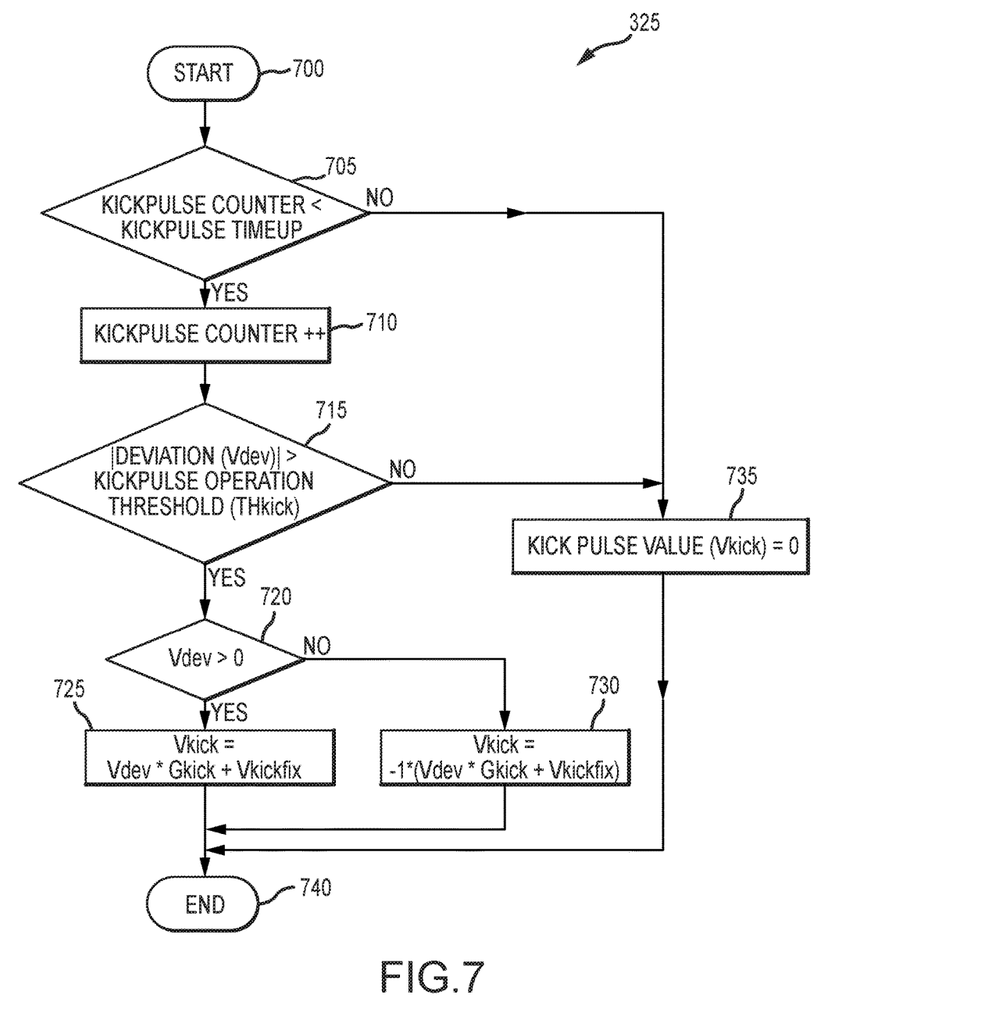
FIG. 7 is a flowchart for calculating a kick pulse in an autofocus system in accordance with an exemplary embodiment of the present technology.

If the kickpulse counter is less than the kickpulse timeup, then the kickpulse counter is incremented by 1 (710). The kick pulse circuit 205 may then determined whether or not an absolute value of the deviation value Vdev is greater than a kickpulse operation threshold THkick (715). The kickpulse operation threshold THkick is a predetermined value and may be based on suitable parameters such as the desired operating specifications, settling time, and the like. For example, step 715 may serve as a countermeasure in the event that the kick pulse circuit 205 was inadvertently activated.

If the absolute value of the deviation value Vdev is not greater than the kickpulse operation threshold THkick, then the kickpulse value Vkick is set to zero (735) and the operation ends by outputting the kick pulse value Vkick (740).

If the absolute value of the deviation value Vdev is greater than the kickpulse operation threshold THkick, then the kick pulse circuit 205 determines whether or not the deviation value Vdev is greater than zero (720). If the deviation value Vdev is greater than zero, then the kick value Vkick is computed according to the following equation: Vkick=Vdev*Gkick+Vkickfix, where Gkick is a fixed value that influences the magnitude of the kick pulse signal Vkick, and Vkickfix is also a fixed value that influences the magnitude of the kick pulse signal Vkick (725). The values of Gkick and Vkickfix are predetermined and based on the specifications of the actuator 208 and/or desired outcome. If the deviation value Vdev is not greater than zero, then the kick value Vkick is computed according to the following equation: Vkick=-1*(Vdev*Gkick+Vkickfix) (730). The kick operation ends (740) after the kick value is computed and the kick pulse circuit 205 then outputs the kick value Vkick to the second summing circuit 235 to be summed with the output PIDout of the PID controller 215.

After the second summing circuit sums the kick value Vkick and the P controller output PIDout to obtain the new position value Pnew, the DAC 270 may convert the new position value Pnew to an analog signal where the analog signal is transmitted to the constant current driver 225. The constant current driver 225 provides the driver current $I_{dr}$ to control the position of the actuator 280. The actuator 280 responds to the magnitude and direction of the driver current $I_{dr}$.

Figure 3:
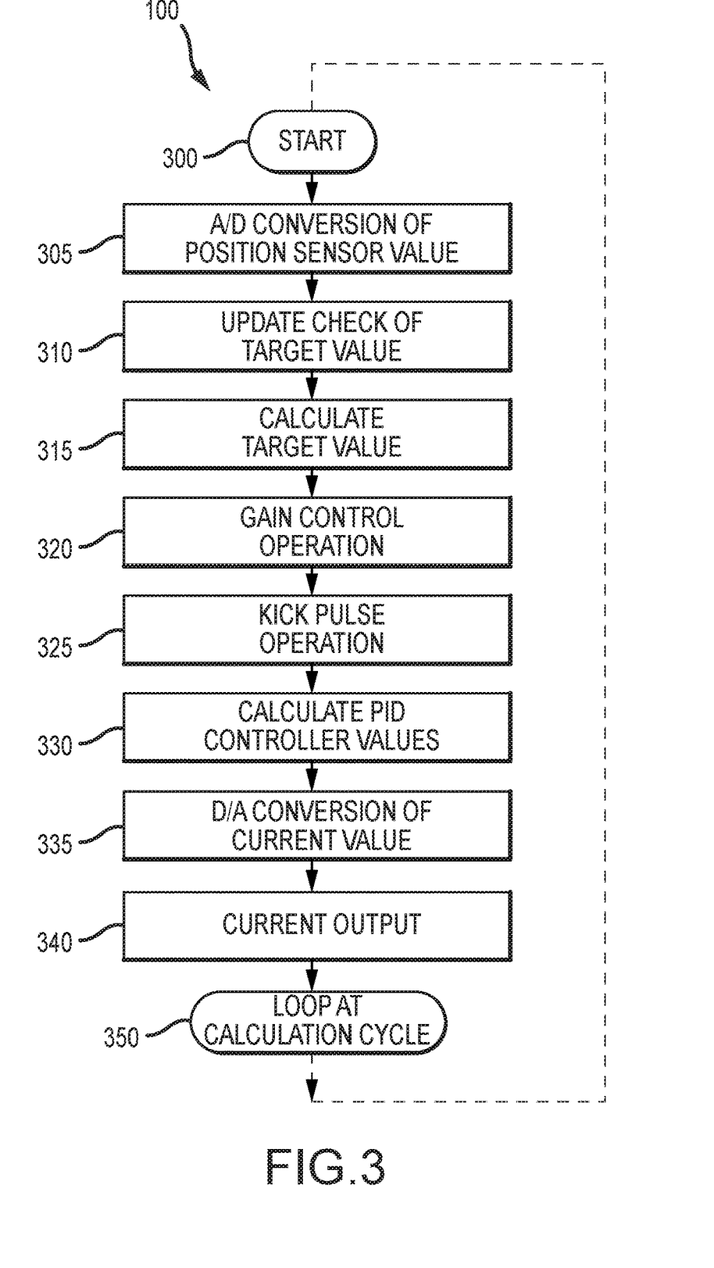
FIG. 3 is a flowchart of an autofocus system in accordance with an exemplary embodiment of the present technology.
Figure 4:
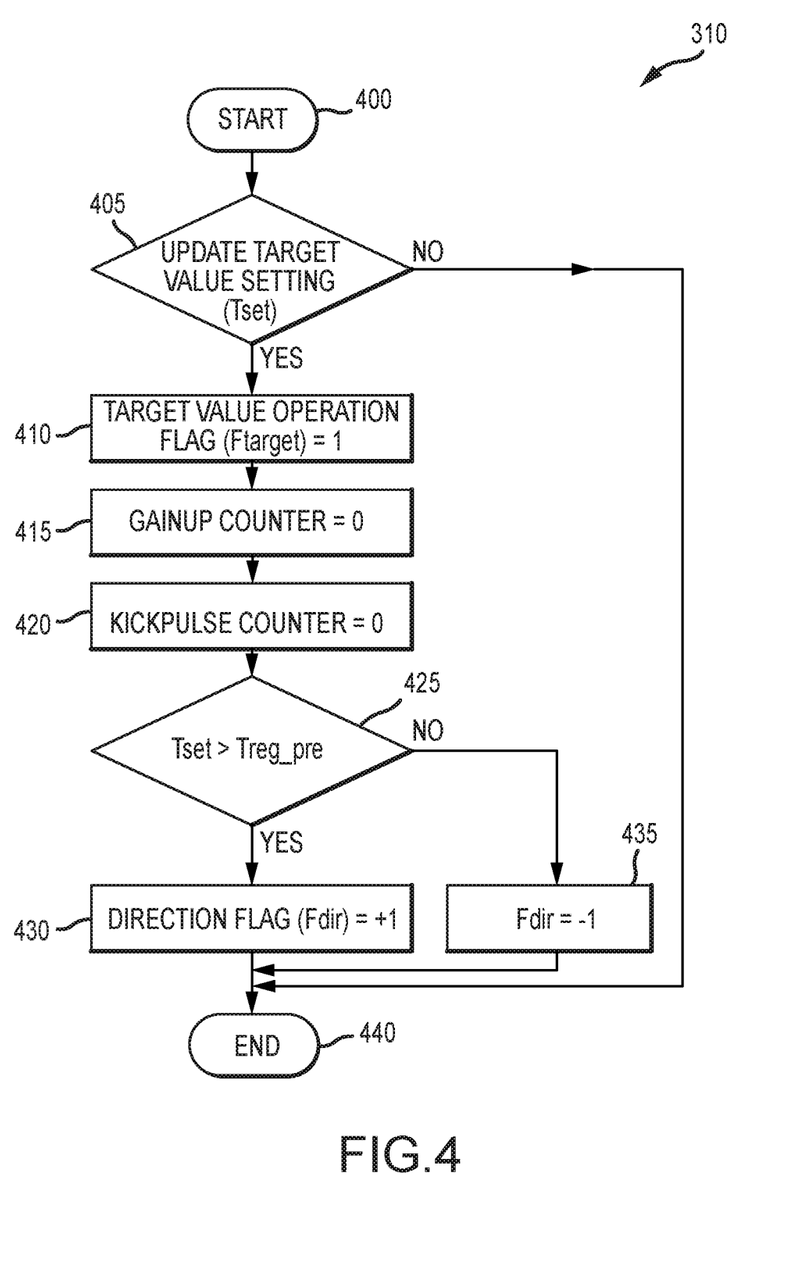
FIG. 4 is a flowchart for updating a target value in an autofocus system in accordance with an exemplary embodiment of the present technology.
Figure 10A:
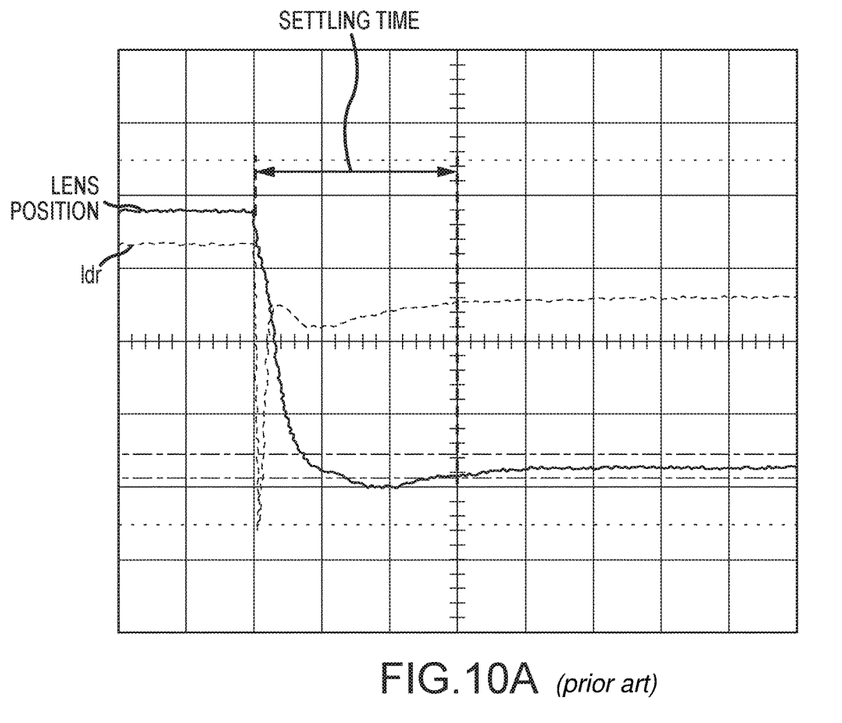
FIG. 10A is an output waveform for a conventional autofocus system.
Figure 10B:
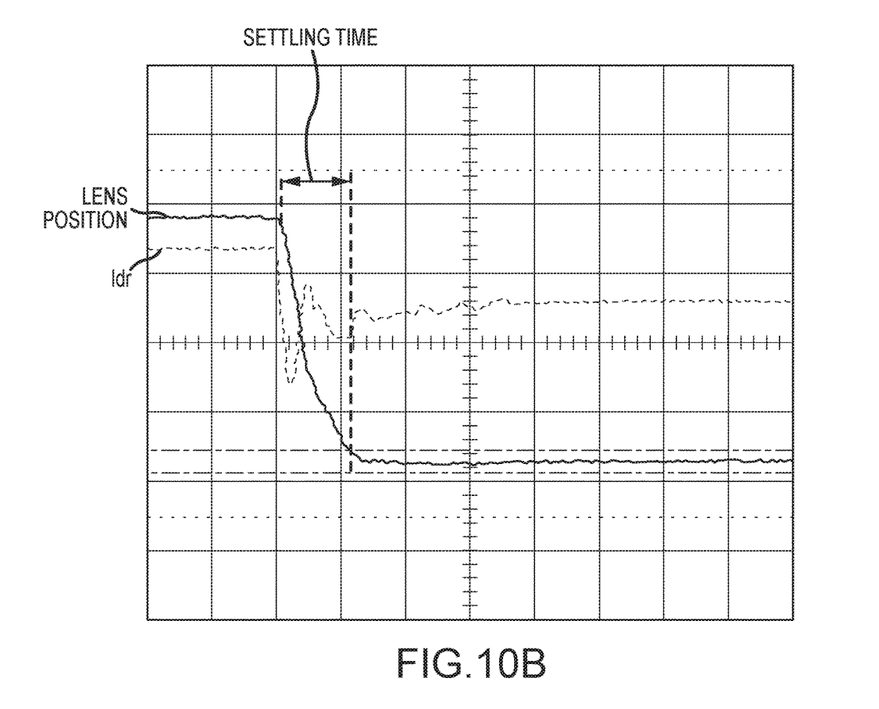
FIG. 10B is an output waveform in accordance with an exemplary embodiment of the present technology.

After the actuator 280 receives the driver current $I_{dr}$, the position sensor 200 detects a new position and the cycle starts over at the start (300) of FIG. 3. The process as described in FIG. 3 continues until the lens 130 has settled at the target position. In an exemplary embodiment, and referring to FIG. 10B, the variable step circuit, the gain control circuit 210, and the kick pulse circuit 205 operate together to decrease the settling time of the lens, from a starting position to the target position, as compared to an existing system (for example, as illustrated in FIG. 10A). For example, the settling time for the existing system is approximately 15 ms, while the settling time for the present technology is approximately 5 ms.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An autofocus apparatus capable of focusing an image with a lens and receiving image data from an image signal processor, comprising:
   an actuator coupled to and configured to move the lens;
   a position sensor coupled to the lens, wherein the position sensor outputs a position signal representing a position of the lens;
   a driver circuit coupled to the actuator, comprising:
      a variable step circuit coupled to the image signal processor and configured to calculate an intermediate target value;
      a first summing circuit coupled to the position sensor and an output of the variable step circuit and configured to sum the position signal and the intermediate target value to produce a deviation value; and
      a signal control circuit coupled to an output of the first summing circuit and configured to adjust a control variable and adjust a gain of the control variable;
   wherein:
      the driver circuit outputs a constant driver signal to the actuator according to the control variable; and
      the actuator is responsive to the constant driver signal.

2. The autofocus apparatus according to claim 1, the signal control circuit is further configured to generate a kick pulse signal, wherein the kick pulse signal adjusts the magnitude and direction of the control variable.

3. The autofocus apparatus according to claim 2, wherein the kick pulse signal is generated if the deviation value is less than a minimum threshold value.

4. The autofocus apparatus according to claim 1, wherein the signal control circuit comprises a gain control circuit coupled to the output of the first summing circuit and configured to receive the deviation value and adjust the gain based on the deviation value.

5. The autofocus apparatus according to claim 4, wherein the gain control circuit comprises:
   a first gain control element;
   a second gain control element;
   a third gain control element; and
   a fourth gain control element;
   wherein the second, third, and fourth gain control elements are coupled in parallel, and the first gain control element is coupled in series with the second, third, and fourth gain control elements.

6. The autofocus apparatus according to claim 5, wherein the signal control circuit further comprises a PID controller coupled to the gain control circuit; wherein the PID controller comprises:
   a P controller coupled to an output of the second gain control element;
   an I controller coupled to an output of the third gain control element; and
   a D controller coupled to an output of the fourth gain control element.

7. The autofocus apparatus according to claim 4, wherein the signal control circuit further comprises a PID controller coupled to an output of the gain control circuit, wherein the PID controller outputs a PID signal.

8. The autofocus apparatus according to claim 7, wherein the signal control circuit further comprises a kick pulse circuit coupled to an output of the first summing circuit and configured to output a kick pulse signal having a magnitude and a direction.

9. The autofocus apparatus according to claim 8, wherein the signal control circuit further comprises a second summing circuit coupled to an output of the kick pulse circuit and an output of the PID controller, and configured to:
   change a magnitude and a direction of the PID signal according to the kick pulse signal; and
   output a new position signal.

10. A method for performing autofocus with a lens, comprising:
   capturing image data;
   generating a position signal representing a position of the lens;
   generating a target position according to the image data;
   generating an intermediate target value according to the generated target position;
   computing a deviation value according to the generated intermediate target value and the generated position signal;
   applying a gain to the computed deviation value;
   computing a kick pulse signal based on the computed deviation value;
   computing a new position value based on the computed kick pulse signal and a control signal; and
   repositioning the lens according to the new position value.

11. The method for performing autofocus according to claim 10, wherein applying the gain to the deviation value comprises applying one of a predetermined first gain and a predetermined second gain according to a gain counter.

12. The method for performing autofocus according to claim 11, computing the kick pulse signal is further based on whether the deviation value is greater than a threshold value.

13. The method for performing autofocus according to claim 10, further comprising computing the kick pulse signal based on the computed deviation value.

14. The method for performing autofocus according to claim 10, wherein generating the intermediate target value comprises computing a step value based on a step width and a step number.

15. The method for performing autofocus according to claim 14, wherein generating the intermediate target value further comprises summing the step value with a previous intermediate target value.

16. An imaging system with an autofocus feature, comprising:
　an image sensor configured to capture image data;
　an image signal processor coupled to the image sensor and configured to process the image data;
　a lens module positioned adjacent to the image sensor, comprising:
　　a lens;
　　an actuator coupled to and configured to move the lens;
　a position sensor responsive to a position of the lens, wherein the position sensor outputs a position signal; and
　a driver circuit coupled to the image signal processor and the actuator, comprising:
　　a variable step circuit coupled to the image signal processor and configured to calculate an intermediate target value;
　　a first summing circuit coupled to the position sensor and an output of the variable step circuit and configured to sum the position signal and the intermediate target value to produce a deviation value;
　　a signal control circuit, comprising:
　　　a gain control circuit coupled to an output of the first summing circuit and configured to receive the deviation value and apply a gain based on the intermediate target value;
　　　a PID controller coupled to an output of the gain control circuit, wherein the PID controller outputs a PID signal; and
　　　a kick pulse circuit coupled to an output of the first summing circuit and configured to output a kick pulse signal having a magnitude and a direction; and
　　a second summing circuit coupled to an output of the kick pulse circuit and an output of the PID controller, and configured to change a magnitude and a direction of the PID signal according to the kick pulse signal and output a new position signal;
　wherein the actuator is responsive to the new position signal.

17. The imaging system according to claim 16, wherein the gain control circuit comprises:
　a first gain control element;
　a second gain control element;
　a third gain control element; and
　a fourth gain control element;
　wherein the second, third, and fourth gain control elements are coupled in parallel, and the first gain control element is coupled in series with the second, third, and fourth gain control elements.

18. The imaging system according to claim 17, wherein the PID controller comprises:
　a P controller coupled to an output of the second gain control element;
　an I controller coupled to an output of the third gain control element; and
　a D controller coupled to an output of the fourth gain control element.

19. The imaging system according to claim 16, wherein the variable step circuit further computes:
　a step value based on a step width and a step number; and
　calculates the intermediate target value by summing the step value with a previous intermediate value.

20. The imaging system according to claim 16, wherein the kick pulse circuit generates the kick pulse signal based the deviation value.

* * * * *